United States Patent [19]
Morris

[11] Patent Number: 5,772,850
[45] Date of Patent: Jun. 30, 1998

[54] APPARATUS FOR VAPOR COMPRESSION DISTILLATION

[76] Inventor: Bobby D. Morris, 103 Lake Forest Dr., Greer, S.C. 29651

[21] Appl. No.: 439,303

[22] Filed: May 11, 1995

[51] Int. Cl.$^6$ ................................ B01D 1/12; B01D 3/04
[52] U.S. Cl. ................ 202/237; 202/267.1; 159/27.1; 159/28.5; 159/24.2
[58] Field of Search .................................. 202/197, 237, 202/267.1; 203/26, 40, 86, 24, 98, 100, 267.1; 159/16.3, 23, 28.5, 24.2, 27.1, 901, DIG. 2, DIG. 13

[56] References Cited

U.S. PATENT DOCUMENTS

| | | | |
|---|---|---|---|
| 1,910,242 | 5/1933 | Chittick | 159/28.5 |
| 1,943,106 | 1/1934 | Burnham | 202/197 |
| 2,449,587 | 9/1948 | Chambers | 202/237 |
| 2,584,357 | 2/1952 | Loebel | 203/26 |
| 2,696,465 | 12/1954 | Kittredge | 202/185.1 |
| 3,000,795 | 9/1961 | Goeldner | 203/2 |
| 3,216,480 | 11/1965 | Schilt | 202/237 |
| 3,527,281 | 9/1970 | Hamill | 159/27.1 |
| 3,748,234 | 7/1973 | Pottharst, Jr. | 159/27.1 |
| 4,030,985 | 6/1977 | Barba et al. | 203/26 |
| 4,168,211 | 9/1979 | Pottharst, Jr. | 159/24.2 |
| 4,710,272 | 12/1987 | Passarelli et al. | 202/205 |
| 5,221,439 | 6/1993 | Li et al. | 202/267.1 |
| 5,250,151 | 10/1993 | Huercanos | 159/901 |
| 5,472,574 | 12/1995 | Roark, Sr. | 202/237 |

*Primary Examiner*—Robert J. Warden
*Assistant Examiner*—Theresa T. Snider
*Attorney, Agent, or Firm*—Hardaway Law Firm P.A.

[57] ABSTRACT

A vapor compression distillation process and apparatus is provided wherein the apparatus includes a container having a generally vertical longitudinal center axis and bottom and top end caps, a plurality of generally vertical tubes spacedly disposed within the container, the tubes being fixedly held in position by opposing top and bottom tube sheets defining a condensing chamber therebetween wherein the condensing chamber has an upper, partially sectioned off chamber, an evaporation chamber within the container between the top tube sheet and a top end cap, a vapor compressor communicating with an upper area of the evaporation chamber and with the upper chamber of the condensing chamber, heat input communicating with the container, and a plurality of passages for passing a liquid into or out of the container. The process involves passing a liquid upwardly through the tubes, boiling the liquid to cause evaporation and create vapor, passing the vapor through a vapor compressor, passing the compressed vapor into the upper chamber of the condensing chamber and then to a remainder of the condensing chamber where condensation occurs and a distillate is formed. Movement of the tubes within the container provides a self-cleaning feature wherein scale build-up and potential is automatically reduced.

17 Claims, 4 Drawing Sheets

APPARATUS FOR VAPOR COMPRESSION DISTILLATION

BACKGROUND OF THE INVENTION

Invention relates generally to the art of energy recycling processes and apparatuses, and more particularly to an improved process and apparatus for vapor compression distillation.

A variety of processes and apparatuses utilizing vapor compression for distillation exist in the prior art. Such prior art processes and apparatuses frequently employ an evaporator chamber for creating vapor from a liquid passing therethrough. The vapor is usually compressed to enable its use as a primary source of heat in the evaporator chamber. The compressed vapor is condensed and its heat is transferred to the heated liquid by means of an indirect contact heat transfer element such as a tube bundle.

Frequently, some type of secondary method or medium is needed for cooling in distillation apparatuses. Most conventional distillation systems including vacuum distillers require methods for condensation cooling. Huge amounts of cold water or refrigeration systems are commonly used.

Scale potential is defined as the level at which a liquid bearing aqeous solution will allow the contaminants to attach to metal surfaces. All dissolved solids have a critical and differing saturation point and condition at which they leave an aqeous solution and attach to a metal surface and continue to build up.

Water is often referred to as a universal solvent, and it never exists naturally in a pure form. The amount of dissolved and suspended impurities in water supplies varies over a wide range and these dissolved impurities cause scale attachment to metal surfaces.

There are many causes of scale attachment and scale build-up on heat exchanger surfaces. The affinity level of contaminates to a metal surface is dependent on the type of impurity, ph, movement of the solution against the surface, temperature, temperature difference, and saturation level of the liquid, and to a lesser degree type of metal.

Since all natural waters contain at least some impurities which cause scale, scale will form on metal surfaces. In conventional distillation equipment, the evaporator is generally a common steam boiler and has the associated scale problems which require the use of scale inhibitor chemicals and cleaning chemicals. In the condenser, scale is a problem because cooling water contains impurities. To make matters worse, the volume of cooling water is usually about eighteen times the distillation rate. Approximately eighteen times as many impurities pass by the metal surfaces of the heat exchanger making scale potential enormous. Cleaning is almost a daily procedure in conventional distillation systems while using normal city water.

It is impractical to use conventional distillation equipment for wastewater because of the high level of impurities which attach to the heat exchanger surfaces and reduce the effectiveness of heat transfer.

A variety of processes and apparatuses teaching compression of vapors from evaporated liquids are disclosed in U.S. Pat. Nos. 1,461,640; 1,827,846; 2,449,587; 3,109,782; 3,192,130; 3,423,293; 3,480,515; 3,488,261; 3,849,259; 3,901,768; 3,956,072; 4,082,616; 4,259,160; 4,710,272; and 4,783,242.

U.S. Pat. No. 2,449,587 teaches a method and apparatus for distillation wherein solution to be distilled is boiled in vertically extending passages with upward flow of the boiling solution within the passages and recirculation of the solution through a down-comer of the lower ends of the passages for reboiling of the solution therein.

U.S. Pat. No. 3,488,261 discloses a vapor compression unit for removing impurities from liquids utilizing an evaporator chamber, a vapor compressor, and a power source which can also act as a heat source. A vent condenser is incorporated into the unit in the outlet portion of the manifold on the tube bundle associated with the evaporator so that uncondensed vapors exiting from the tube bundle of the evaporator pass immediately over the vent condenser to further condense the vapors prior to exhausting the uncondensed vapors and non-condensable ones to the atmosphere. An exhaust gas boiler is also included in the evaporator chamber and exhaust gases from the power source are used to generate additional vapors for the system.

Methods for recycling energy in counterflow heat exchange and distillation are disclosed in U.S. Pat. Nos. 4,671,856 and 4,769,113. U.S. Pat. No. 4,671,856 teaches a method of producing a concentrate and a distillate from a given feed material which is at least in part liquid, comprising providing a vertically extending boiling chamber and a vertically extending condensing chamber on opposite sides of a vertically extending plate member which includes a specific boiling surface on one side thereof and a condensing surface on an opposite side thereof. The plate member is sufficiently thermally conductive and sufficiently thin to conduct heat across the two surfaces relatively efficiently. A continuous feed supply is replenished into the boiling chamber so that the boiling chamber is filled with feed material to a level which entirely covers the boiling surface when the feed material is caused to boil. Boiling of the feed material occurs evenly and produces a vapor from some of the feed material and a concentrate from the rest of the material. As it is formed, the concentrate is continuously directed out of the boiling chamber into a collection chamber, and the vapor is directed out of the boiling chamber and into the condensing chamber through a compression chamber where, by means of compression, the vapor is elevated in pressure by an amount not to exceed about two psi higher than the minimum required for condensation at atmospheric pressure. A portion of the vapor is directed vertically downward uniformly and evenly across the entire condensing surface of the plate member so as to cause it to condense and form a distillate thereon and at the same time, transfer its heat of condensation across the plate member to the boiling surface for aiding in boiling the feed material at the boiling surface. As distillate is formed on the condensing surface, it is continuously directed out of the condensing chamber. A second, vertically extending plate member is included in the boiling chamber and defines a surface spaced a small distance from and in confronting relationship with the common plate member such that the two plate members define a vertically extending, laterally narrow boiling chamber.

U.S. Pat. No. 4,769,013 also discloses a method of producing a concentrate and a distillate from a given feed material which is at least in part liquid; however, a spiral-shaped boiling chamber, a vertically extending spiral-shaped condensing chamber, and a spiral-shaped common plate member are utilized.

Despite the various prior art techniques utilizing vapor compression distillation, there exists much room for improvement in the art of vapor compression distillation.

SUMMARY OF THE INVENTION

It is therefore an object of this invention to provide an improved process and apparatus for vapor compression distillation.

It is another object of this invention to provide a process and apparatus for vapor compression distillation which is highly efficient and economical.

It is another object of this invention to provide a process and apparatus for vapor compression distillation which can easily be used for a variety of processes, including purifying impure water and resource recovery.

It is yet another object of this invention to provide an improved process and apparatus for vapor compression distillation which utilizes strategically located components for maximum stratification of temperature and non-condensable gases.

It is a further object of this invention to provide an improved process and apparatus for vapor compression distillation wherein scale attachment to the heat exchanger tubes is controlled better than in conventional systems.

It is a still further object of this invention to provide an improved process and apparatus for vapor compression distillation which self-cleans scale build-up on the heat transferring surfaces.

It is a still further object of this invention to provide an improved process and apparatus for vapor compression distillation wherein purity of distillate and evaporation is controlled.

These as well as other objects are accomplished by a vapor compression distillation process and apparatus comprising a container having a generally vertical longitudinal center axis, opposing end plates closing each end of the container, a plurality of generally vertical tubes spacedly disposed within the container being held fixedly in position by opposing top and bottom tube sheets defining a condensing chamber therebetween with the condensing chamber having an upper, partially sectioned off area or chamber, an evaporation chamber within the container between the top tube sheet and the top end cap, a vapor compressor communicating with an upper area of said evaporation chamber and with the upper chamber of the condensing chamber, heating means communicating with the container, and a plurality of passages for passing a liquid into or out of the container. The process of this invention comprises passing a liquid upwardly through the tubes, boiling the liquid to cause evaporation and create vapor, passing the vapor through a vapor compressor, passing the compressed vapor into the upper chamber of the condensing chamber and then to a remainder of the condensing chamber where condensation occurs and a distillate is formed. Movement of the tubes within the container provides a self-cleaning feature wherein scale build-up and potential is automatically reduced.

DETAILED DESCRIPTION

In accordance with this invention, it has been found that vapor compression distillation may be improved by the process and apparatus described herein. The improved vapor compression distillation process and apparatus of this invention use no chemicals, exchange beds or other media and are highly efficient and economical as well as less complex than some prior art processes and apparatuses. The process and apparatus according to this invention can easily be used for a variety of processes, including purifying impure water and resource recovery. The improved process and apparatus for vapor compression distillation according to this invention utilize strategically located components for maximum stratification of temperature and non-condensable gases. Furthermore, quite advantageously, although this process and apparatus for vapor compression distillation can accomplish distillation with minimal scale build-up, it has been found that this process and apparatus can self-clean and inhibit scale build-up on the heat transferring surfaces. Further advantages and features will become apparent from the following description given with reference given to the various figures of drawing.

The vapor compression distillation apparatus according to the present invention provides a novel process and apparatus for distilling or treating process waste water. The process and apparatus taught herein is particularly suitable for the recovery of resources such as water, metals, minerals, chemicals and energy. Additionally, the process and apparatus according to this invention reduce the volume of process waste for disposal and/or treatment or waste minimization. Accordingly, a significant advancement in waste minimization is disclosed herein.

Figure 1:
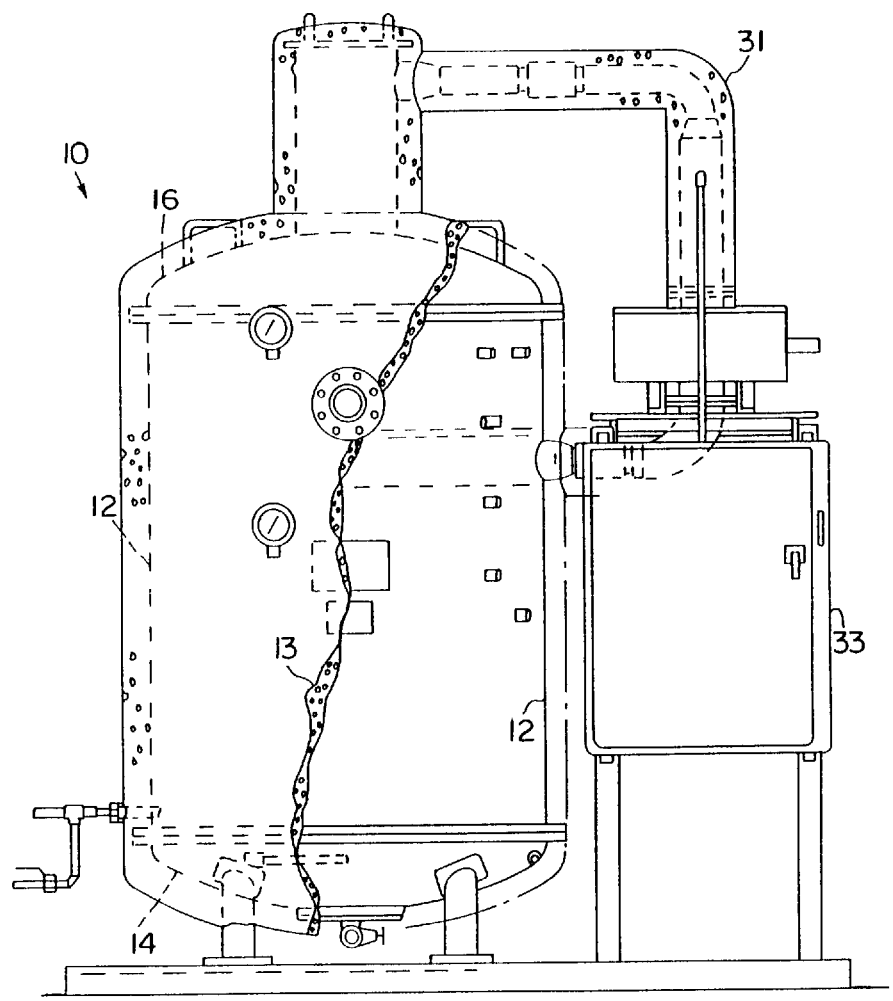
FIG. 1 of the drawings is an elevational view in partial cutaway illustrating the overall assembly of the vapor compression distillation apparatus according to the present invention.

FIG. 1 of the drawings is a perspective view of a vapor compression distillation apparatus 10 according to the present invention. The distillation apparatus 10 is based upon adiabatic compression of vapor and using the resulting temperature rise, while the latent heat remains near the same, to boil more liquid to make more vapor. This process can be repeated on and on, and in a perfect system, the only energy needed for distillation by this process is that energy required to operate the vapor compressor. This energy is substantially less than that required to boil the same liquid using sensible heat.

Figure 2:
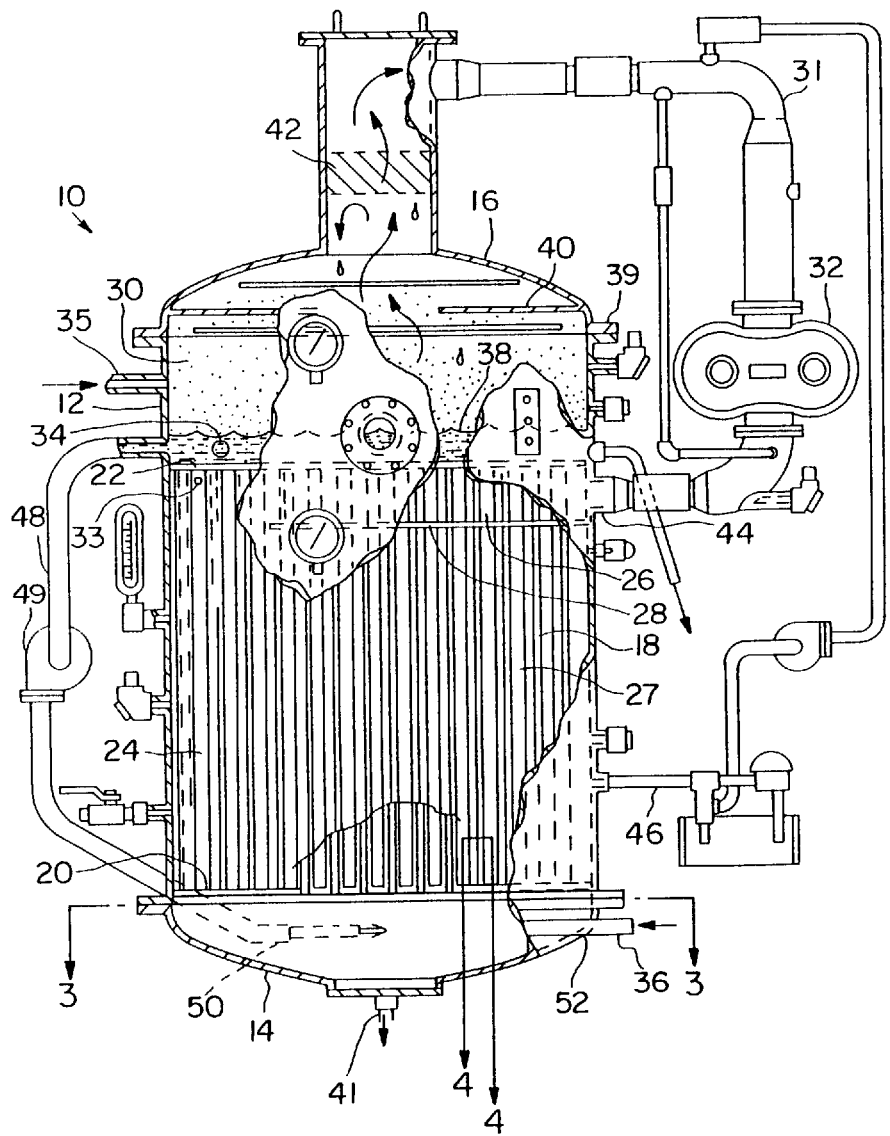
FIG. 2 of the drawings is an elevational view in partial section illustrating the vapor compression distillation apparatus according to the present invention.
Figure 5:
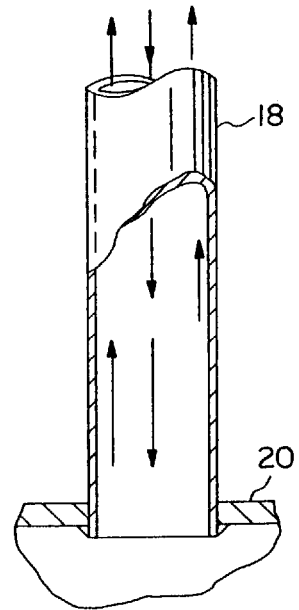
FIG. 5 of the drawings is a partial sectional view of a heat exchanger tube according to the present invention.

FIGS. 1 and 2 of the drawings illustrate the vapor compression distillation apparatus 10 according to this invention. As illustrated, apparatus 10 comprises container 12, surrounded by insulation 13, which has a generally vertical longitudinal center axis, and a pair of opposing end caps, bottom end cap 14 and top end cap 16. A plurality of generally vertical tubes 18, which are heat exchangers, are spacedly disposed within container 12. Inclined tubes of approximately thirty (30) degrees or more from horizontal have been found to discharge solids at the lower ends of the tubes and have less tendency to collect solids. The nearer the tubes are to vertical orientation, the better the solids are removed from the tubes by gravity. Tubes 18 are fixedly held in position by opposing tube sheets, bottom tube sheet 20 and top tube sheet 22, which define a condensing chamber 24 therebetween. Tubes 18 can be welded to the tube sheets or sealed thereto with an elastomer or other conventional means. Tubes 18 connect with or pass through each opposing tube sheet, however, it is preferred that each of the tubes 18 begin and end at the opposing tube sheets. FIG. 5 shows a portion of a tube as held by bottom tube sheet 20. The upper ends of the tubes open into the evaporation chamber 30. In the preferred embodiment, condensing chamber 24 includes an upper chamber 26 which is partially but not completely sectioned off within condensing chamber 24. Upper chamber 26 can be formed by a baffle 28 extending within condensing chamber 24 proximate and generally parallel to top tube sheet 22 so that upper chamber 26 is defined between top tube sheet 22 and baffle 28, with baffle 28 not quite extending as far as top tube sheet 22 so that baffle 28 does not close off condensing chamber 24 in order that an opening or passage remain between upper chamber 26 and the remainder of condensing chamber 24. The remainder of condensing chamber 24 is lower chamber 27. As seen in FIG. 2, upper chamber 26 and lower chamber 27 are in communication for allow a condensing vapor to flow therebetween.

An evaporation chamber 30 is defined within container 12 between top tube sheet 22 and top end cap 16. A vapor compressor 32 is utilized in accordance with this invention and communicates with an upper area of evaporation chamber 30 and also with upper chamber 26, as illustrated in FIGS. 1 and 2. Vapor compressor 32 preferably communicates with top end cap 16 through demister 42, discussed below, for passing of vapor from the evaporation chamber 30, through the demister 42, and to the vapor compressor 32 through conduit 31. Compressed vapor leaving vapor compressor 32, however, preferably passes directly to upper chamber 26 of the condensing chamber. To provide heat for the process according to this invention, a heating means communicates with container 12. The heating means is illustrated in the preferred embodiment as steam input 34, although it is envisioned that other conventional heating means known in the art could be utilized in accordance with the present invention. In addition to the above components, a plurality of passages are provided for passing a liquid into or out of container 12, as more fully described below. Control panel 33 is illustrated in FIG. 1 and can be of conventional means for controlling vapor compression distillation process and apparatus.

Figure 3:
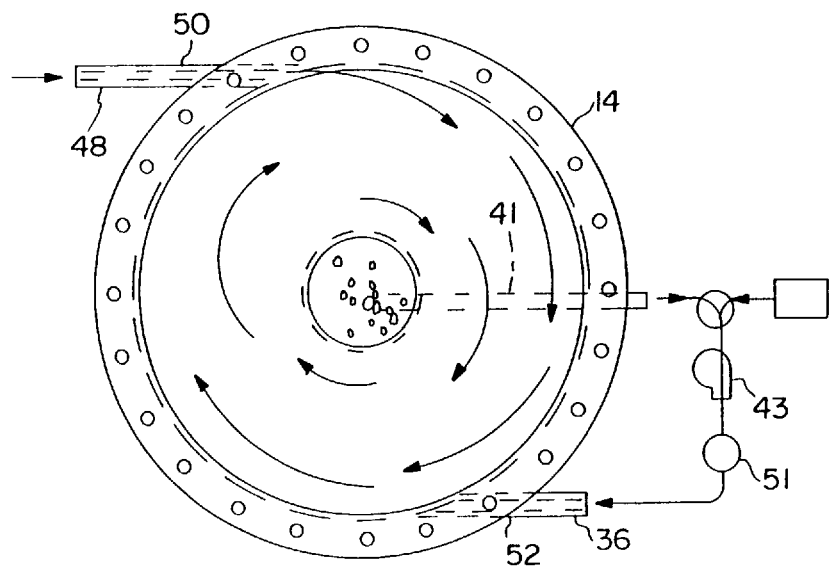
FIG. 3 of the drawings is a cross section view taken along line 3—3 of FIG. 2 illustrating a bottom end cap according to the present invention.

Container 12 according to this invention is preferably cylindrical in shape. End caps 14 and 16 closing off container 12 in the preferred embodiment are both generally spherical, dome or conical shaped with walls that can slope outwardly away from container 12. Bottom end cap 14 as shown in FIGS. 2 and 3 can include a generally flat center portion on which precipitants within container 12 can settle and with which a passage can exist for discharge of such precipitants and other suspended solids.

In the vapor compression distillation apparatus and process according to this invention, a liquid feed stock is introduced into container 12 at an area below tubes 18, preferably through passage 36 into bottom end cap 14. The area beneath tubes 18 is defined by bottom tube sheet 20, bottom end cap 14, and can be further defined by the walls of container 12 depending on the proximity of bottom end cap 14 to bottom tube sheet 20. As liquid continues to enter container 12, the level of liquid below bottom tube sheet 20 continues to rise, and once the liquid reaches bottom tube sheet 20, the liquid rises and passes into each of the generally vertical tubes 18 to fill and pass through tubes 18. The liquid is allowed to rise through tubes 18 and into evaporation chamber 30 where the liquid level is maintained at a predetermined liquid level 38 by a conventional means 39. It is preferred that liquid level 38 be proximate to top tube sheet 22 so that the liquid fills an area above top tube sheet 22 and the upper ends of tubes 18.

Once the liquid level is at level 38, heat can be applied at a strategic point to cause some of the liquid to boil and evaporate. In a preferred embodiment, heat is applied by heating means illustrated as steam input 34 wherein steam input 34 connects with container 12 at an area immediately above top tube sheet 22 and below liquid level 38. In this manner of applying heat, it has been found that only the liquid above top tube sheet 22 and liquid in the upper ends of tubes 18 proximate top tube sheet 22 can be caused to boil. As illustrated in FIG. 5, hot liquid vapor rises through tubes 18 while cold liquid, and precipitants, fall. The advantages of this are discussed more fully below.

Boiling of the liquid causes evaporation and creates a vapor within evaporation chamber 30 which rises towards top end cap 16. To help prevent entrained liquids from passing with the vapor towards top end cap 16, baffles 40 can be utilized within evaporation 30, and therefore, the vapor will pass around and be directed by baffles 40. A demister is preferably used to pass the vapor therethrough to further prevent entrained liquids from passing with the vapor, and demister 42 is illustrated in the drawings as attached to a top of top end cap 16. From demister 42, the vapor passes to vapor compressor 32 where the vapor is compressed and pressurized.

Leaving vapor compressor 32, the hot, compressed vapor is passed into condensing chamber 24 of container 12. It has been found quite advantageous and is preferred according to this invention that the hot, compressed vapor from vapor compressor 32 is passed directly into upper chamber 26 of condensing chamber 24. This strategic input of the hot, compressed vapor from vapor compressor 32 is immediately below top tube sheet 22 and facilitates boiling of liquid maintained above top tube sheet 22 and in the upper ends of tubes 18. As the hot, compressed vapor passes through upper chamber 26, the vapor cools significantly prior to passage from upper chamber 26 to a remainder of condensing chamber 24. As illustrated in the drawings, it is preferred that the opening or passage for communication between upper chamber 26 and a remainder of condensing chamber 24 be on an opposite side of container 12 from the point of input of the hot, compressed vapor from vapor compressor 32 which is designated as vapor input 44 in the drawings.

In condensing chamber 24, the vapor is condensed as distillate surrounding and giving up its heat to tubes 18 having liquid feed material therein. The distillate formed in condensing chamber 24 is then collected at the bottom of condensing chamber 24 for discharge from container 12 such as through passage 46.

The above description outlines the basic process and apparatus according to the invention. A more complete description of this process and apparatus is presented below.

It has been found according to this invention that a stagnant solution or liquid within container 12 results in higher scale build-up and potential than liquid which is moving. The higher the turbulence, the less likely it is that scale will build up on tubes 18. It is therefore best and preferred to have a continuous flow of liquid through the process and apparatus of this invention. In order to, among other, things, facilitate continuous flow of liquid through container 12, a recirculation passage 48 and pump 49 are utilized to pull liquid from above top tube sheet 22 and below liquid level 38 and pump it back into bottom end cap 14 for recirculation through tubes 18.

As illustrated in FIG. 2 and 3, it is preferred that recirculation passage 48 connect tangentially as shown at 50 to bottom end cap 14 to provide a swirling motion and flow below bottom tube sheet 20. To facilitate this swirling action of the liquid below bottom end cap 20, the passage 36 for liquid input also connects tangentially to bottom end cap 14, as shown at 52, but on an opposite side and in an opposing direction from the tangential connection 50 of the recirculation passage to the bottom end cap. The shape of the bottom end cap along with the tangential connection and input of liquid therein, especially liquid pumped through recirculation passage 48, swirls the liquid below bottom end cap 14 so as to simulate a mini-hurricane wherein precipitants and heavier liquids are swept toward the bottom of the eye of the hurricane which is the bottom center of bottom end cap 14. This design is advantageous as it provides a method of collecting precipitants, including solids and/or near solid materials, for discharge from the system at a central and strategic location. Discharge of any such solids and/or heavier liquids can be controlled by any conventional means to maintain the concentrating liquid within predetermined limits. Automatic or manual controls can be employed. The manner of collection and discharge of solids and/or heavier liquids as taught herein is advantageous in order to limit the discharge volume to an amount which does not disturb the thermal balance of the vapor compression distillation process.

Passage 36 supplies liquid feed stock from a reservoir and when the liquid reaches a predetermined level (liquid level 38), a valve allows the liquid to pass out of the container through passage 41 as shown in FIG. 3. Liquid can pass through passage 41 and then be recirculated by pump 43 into the system through passage 36 during the vapor compression distillation process. There is no flow of liquid through passage 41 as the liquid fills to the predetermined level.

A filter can be utilized such as filter 51, to remove large solids from being recirculated back into the system while allowing small solids to flow therethrough. Such small solids act to scrub the inner walls of tubes 18 as the liquid is pumped through the system. Where most of the evaporation occurs is also where most precipitation occurs, so it is advantageous to pump the liquid containing such precipitation through filter 51 for recirculation through the system. The precipitants or solids in the liquid in the form of crystals grow in size as they remain in the liquid. As crystals grow, they will eventually be caught by the filter and removed from the system. It is important that the crystals be removed because they can cause erosion eventually of the tube surfaces and/or can clog the passages within the tubes.

As discussed above, liquid filling bottom end cap 14 passes upwardly through tubes 18, filling the tubes, rising out of the tubes and filling a lower section of evaporation chamber 30 just above top tube sheet 22 wherein the liquid is maintained at level 38. Also as discussed above, heat in the form of steam from steam input 34 is strategically applied to the liquid between liquid level 38 and top tube sheet 22, preferably just below liquid level 38. It has been found that heat can alternatively be applied and inputed just below top tube sheet 22, as at input 33, or above liquid level 38, as at input 35, in accordance with this invention to cause boiling, however, it is preferred that the heat be applied via and at the location of steam input 34, which is shown in FIG. 2.

Boiling of the liquids causes evaporation and formation of vapor within evaporation chamber 30. It has been found that the application of heat as taught herein causes boiling to occur within the liquid contained above top tube sheet 22 as well as in the liquid contained in tubes 18 near the upper ends thereof. As liquid changes phases to a vapor, a dramatic increase in volume occurs on the magnitude of about 1600 times. For example, one cubic foot of liquid usually becomes about 1600 cubic feet of vapor. As this enormous and violent expansion occurs inside tubes 18, liquid and vapor are propelled out the ends of the tubes in a "shot gun" effect causing much turbulence at the ends of the tubes. A mixture of liquids and vapor is therefore blasted upwardly in the evaporation chamber 30. The result of liquid and vapor being blasted upwardly in the evaporation chamber is that a great deal of liquid is entrained with the vapor. A series of baffles 40 are therefore preferably used and arranged within evaporation chamber 30 above liquid level 38 to cause the mass of liquid and vapor being blasted upwardly to change directions several times. The velocity of the mass is slowed and time is provided for separation of liquids and vapor. The mass flow velocity of the liquid and vapor must be low enough for gravity to separate the two.

A major factor in keeping the "shot gun" effect is the size of tubes 18. A larger tube diameter has more space inside and would absorb the violent expansion more readily than a small diameter tube. The larger the tube, the more subtle the "shot gun" effect. Tube diameter should be no less than 1½ inches, and the preferred embodiment is that each of the tubes have a diameter of at least two inches. A larger diameter tube is not of industry standard for the required wall thickness, and larger diameter tubes do not utilize the surface area of the tube sheets.

Evaporation within container 12 occurs nearest the top of liquid level 38 and this is the area where most concentration of impurities will occur. This is also the point where most heat is needed to achieve optimum evaporation, and accordingly, steam input 34 connects just below liquid level 38. The upper portion and level of the liquid is also the section where most of the turbulence will occur and must be controlled. Sensible heat achieved by the vapor compression during the vapor compression process is best utilized for controlling the evaporation process. Hot, compressed vapor from vapor compressor 32 enters container 12 through upper chamber 26 where the hot vapor wraps around the upper ends of tubes 18 where evaporation is occurring. As vapor is pulled into the vapor compressor, the vapor temperature is increased by the vapor process to well above its condensing temperature. Hot, compressed vapor therefore is passed to and through upper chamber 26 wherein the hot, compressed vapor gives up its sensible heat to enhance evaporation near the upper ends of tubes 18. Concentrating heat to this area of tubes 18 evaporates liquid at a point where evaporation needs to occur. The hot, compressed vapor is cooled to near the condensing temperature prior to entering the remainder of condensing chamber 24 where the vapor gives up its latent heat to evaporate more water inside the heat exchanger tubes.

As discussed above, baffles 40 are utilized to facilitate separation of the liquid and vapor mixture which rises upwardly within evaporation chamber 30. Once the vapor passes baffles 40, continuing to rise upwardly within evaporation chamber 30, it is preferred that a small space exist, which can be referred to as a vapor section. The vapor travels through this small vapor section prior to entering demister 42. The vapor section is designed to provide space and time for the vapor to stabilize directional flow prior to entering demister 42, to provide adequate resident time for a complete phase change to occur, and to allow the vapor velocity to be low enough to enhance the liquid and vapor separation by the forces of gravity. Demister 42 is primarily a source of insurance. Occasionally, conditions cause a disturbance within the system and liquid and vapor separation is not completed, such as when severe foaming of the process liquid occurs. Demister 42 is a second and back-up source of assuring that no process liquid enters the vapor compressor and the condensing chamber.

It is therefore seen that the size of the evaporation chamber, the inclusion of baffles 40 therein, and demister 42 assure the purity of steam or vapor passing to vapor compressor 32. The size of each section, the liquid section, the separation section, and the vapor section, within evaporation chamber 30 are therefore critical to vapor velocity and play an instrumental role in helping provide a pure vapor to pass to the vapor compressor. Purity of the vapor determines the quality of distillate produced according to this process, and it is imperative that contamination be controlled and maintained at a minimum at this point to achieve near absence of entrained liquid in the vapor passing through the vapor compressor. It is also seen that demister 42 acts as a mist eliminator and is used to further refine the vapor to a higher degree of purity from entrained liquids. Demister 42 can be of conventional design or specially designed for the purpose of removing entrained liquid from vapor. To meet or exceed the current charge limits imposed by most municipalities requires the vapor to have a purity of above 99%. This is a critical component to achieve acceptable purity of distilled water.

As evaporation occurs in the upper ends of tubes 18 and in the area between top tube sheet 22 and liquid level 38, the liquid is therefore very hot and evaporation causes the liquid to become every concentrated. Recirculation passage 48, as discussed above, is utilized to pump liquid from between top tube sheet 22 and liquid level 38, and therefore, the liquid so pumped is hot and very concentrated. This hot and concentrated liquid is pumped to the coldest section of container 12 which is below bottom tube sheet 20. The hot, concentrated liquid mixes with cooler liquid and is cooled. As the temperature of the concentrated liquid is reduced, so is the critical saturation point of the dissolved solids. A large percentage of precipitation occurs below bottom tube sheet 20, and recirculation passage 48 provides a method to enhance precipitation of solids nearest the discharge point of such solids.

As taught by the present invention, it is therefore seen that the evaporation process and the condensation process, in conjunction with vapor compression, help one another. The design according to this invention provides a method to improve the condensation process by removing most of the sensible heat from the hot, compressed vapor before the vapor passes into the lower section of the condensing chamber. The section of the condensing chamber below the upper chamber 26 is where most condensation will occur. It is ideal in the vapor compression distillation cycle to remove all but the latent heat from the vapor before entering the section where most condensation occurs. By removing all but the latent heat, condensing of the vapor is accomplished more efficiently. The design according to this invention of the condensing chamber including upper chamber 26 utilizes energy more effectively. A higher volume of distillate can be provided per square footage of heat exchanger (tubes 18) surface area. A smaller square footage of heat exchanger surface area with a dual section condensing chamber as taught herein will accomplish the same task as a larger square footage area heat exchanger with a single section type condensing chamber.

A primary and dominant factor determining level of production of the vapor compression distillation process and apparatus according to this invention is the rate of heat transfer of tubes 18 which are the heat exchangers. The ability to transfer heat by a heat exchanger is the coefficient of heat transfer (U value) and is determined by the formula $U = btu/ft^2/hour/°F$. Several factors effect the U value including: the material of construction, type, thickness and surface geometry; the type of solution, chemistry, viscosity and specific gravity; the turbulence of the solution; and the difference in temperature from the cold side to the hot side. The tubes are selected for best heat transfer capability, and the geometry of the heat exchangers as used herein is preferably of the standard cylindrical shape because of ease of cleaning. Waste water has varying degrees of contaminants, viscosity and specific gravity and thereby has an effect on the production rate. The average U of the vapor compression distillation apparatus according to this invention while distilling waste water has been found to be approximately 94 with no turbulators as discussed below.

Figures 6, 7, 8:
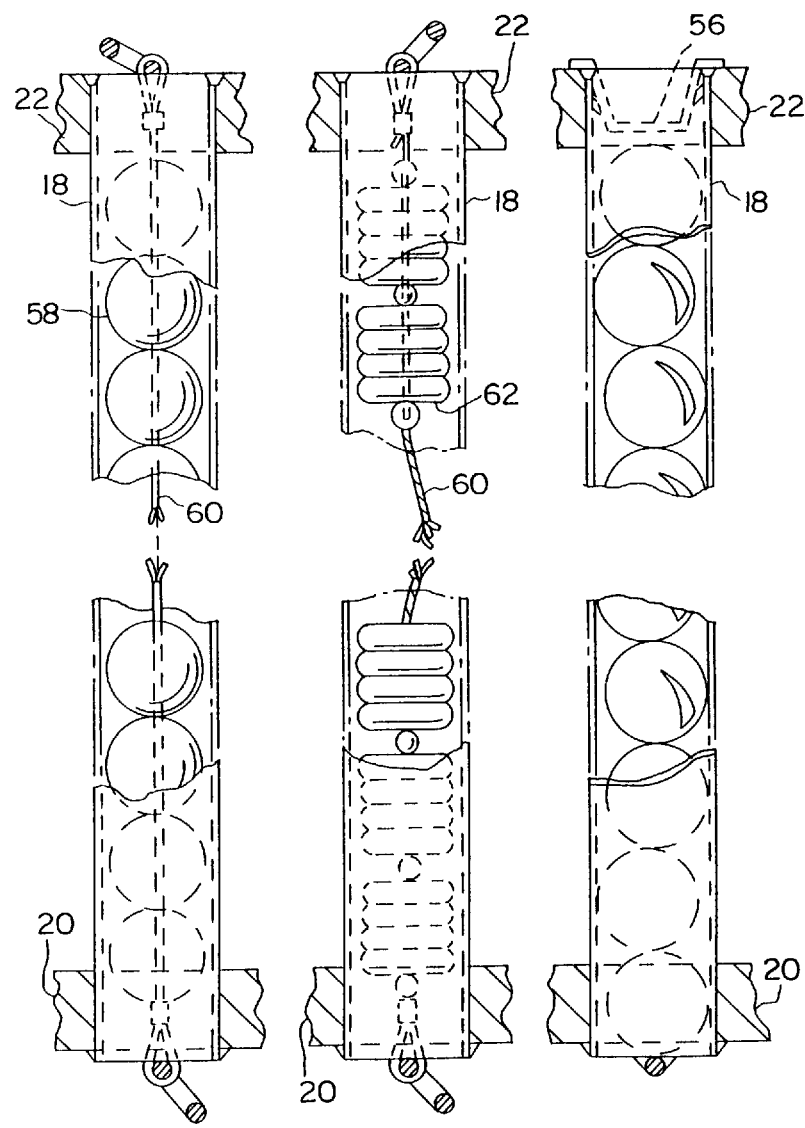
FIGS. 6 through 8 of the drawings are elevational views in partial cutaway illustrating alternative embodiments of a turbulator with heat exchanger tubes according to the present invention.

Turbulence of the liquid has a major effect on the coefficient of heat transfer of tubes 18. Circulation of the liquid causes some turbulence and has a positive effect on production of distillate. Use of a pump for recirculation in passage 48 for recirculating liquids through the system adds some turbulence to the system. In accordance with this invention and referring to FIGS. 6 through 8, turbulators can be used within tubes 18 throughout or partially through the lengths of the tubes to provide significantly increased turbulence and have a positive effect on production of distillates. The turbulators are preferably of a thermoplastic material, such as polypropylene, since scale will have little tendency to attach to the surface of plastic, plastic has superior corrosion resistance, and since plastic typically will cause no damage to tubes 18. Use of turbulators within tubes 18 has the advantage of displacing the volume inside the tubes by a significant percentage. With less volume inside the tubes, there is less volume of liquids in the total system and heat up times will be reduced. Turbulators within tubes 18 can comprise a series of connected or disconnected turbulating members such as thermoplastic balls 58 or similarly shaped beads strung on a rod or cable such as cable 60. Use of a flexible turbulator is preferred and is superior to more rigid types of turbulators. Rather than comprising a series of spherical structures as comprising the turbulators, it is envisioned that other shapes, such as a plurality of tubular members 62 as shown in FIG. 7, may be utilized to cause turbulence and displace liquid volume within tubes 18. It is also possible in accordance with this invention that the turbulators which can be used in tubes 18 each comprise a plurality of unconnected turbulating members wherein the plurality of turbulating members as shown in FIG. 8 are balls 58 and are maintained within tubes 18 by a confining structure such as retainer 56 as shown in FIG. 8. As liquid is pumped upwardly through tubes 18, the turbulators cause increased turbulence. As the liquid begins to boil, vapor will cause more violence and turbulence within tubes as its direct upward pass is constrained by the turbulators. The vapor is deflected by the turbulators, the vapor causes the turbulators to move vertically and horizontally and provide a great deal of turbulence within the liquid. Movement of the turbulators within tubes 18 also will cause some scrubbing action against the surface of the tubes and help prevent scale from depositing and building up on the inner tube surfaces. Movement of the turbulators will also assist with removal of scale already built up on the tube surfaces.

Figure 4:
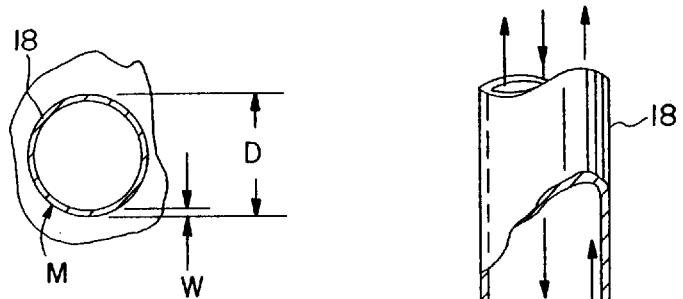
FIG. 4 of the drawings is a cross section view taken along line 4—4 of FIG. 2 illustrating a heat exchanger tube according to the present invention.

A significant advantage in the vapor compression distillation process and apparatus according to this invention is that tubes 18 have been found to dilate and constrict to provide a self-cleaning of scale build-up and potential scale build-up on tubes 18. This self-cleaning feature has been found for some waste streams to eliminate the need for physical cleaning where scale is scrubbed off or otherwise physically removed. The dilation and constriction of the tubes is microscopic, however, but does have a significant effect on scale build-up and potential scale build-up. Mechanical and thermal dilation of tubes 18 occurs and causes a flaking off of hard scale build-up on tubes 18. Soft scale build-up on tubes 18 will be disturbed by the movement of tubes 18 and cause the soft scale to be re-dissolved into solution or be carried by the solution as suspended solids. Soft scale generally is more water soluble than hard scale, so soft scale readily re-dissolves in water during the cleaning cycle. The action of the tubes also inhibits and reduces potential scale build-up. Factors according to this invention that have been found to have an impact on the ability of tubes 18 to self-clean include the diameter to wall thickness ratio of tubes 18, as illustrated in FIG. 4, the coefficient of thermal expansion of tubes 18, and the modulus for elasticity of tubes 18. A determination of these factors depends upon the material of construction. With a two inch diameter tube of 300 series stainless steel, a wall thickness of 0.035 inches would be preferred. This self-cleaning feature according to this vapor compression distillation process and apparatus is advantageous since scale attachment to tubes 18 and scale potential is reduced without shutting the system down and physically or mechanically cleaning tubes 18. This allows tubes 18 to transfer heat continuously as in a near like-new state with the tube surfaces remaining clean.

Mechanical dilation and constriction of tubes 18 is accomplished by pressure differences inside the tubes and outside the tubes. Three mechanical forces cause the tubes to stretch and constrict in a microscopic way, but enough to affect scale buildup. One such mechanical force is pressure generated by the vapor compressor which causes a difference in pressure from the inside of a tube to the outside of a tube. Pressure differentials change as the compressor is stopped and started. A second such mechanical force is pressure created by rise and fall with normal variations in operating temperature. A third such mechanical force is small pulsations which are generated by the compressing action of the vapor compressor. A positive displacement type vapor compressor is the preferred embodiment, however, any type of compressor may be employed. All types of vapor compressors generate pulsations of some magnitude. Each of these mechanical forces cause microscopic movement of tubes 18 to enable the system to have an automatic self-cleaning feature.

Thermal dilation is accomplished by varying the temperature of the heat exchanger surfaces, which is the surface of tubes 18. As the temperature of the tube surfaces changes, the tubes grow or retract microscopically. A thin tube provides more elasticity and results in more movement of the tubes. As the tube surfaces move, hard scale formations crack and fall away. Temperature changes within the system result from normal fluctuations of operating temperature and stopping or starting the vapor compressor distillation process. It is therefore seen that mechanical dilation and thermal dilation by way of pressure and temperature are two independent factors for the self-cleaning process, but these factors combine for an effective self-cleaning as described herein.

The vapor compression distillation apparatus according to this invention has numerous useful applications. An illustrative, but not exhaustive, list of possible applications follows below.

USES FOR VAPOR COMPRESSION DISTILLATION APPARATUS

1. Distillation of brackish or sea water
2. Concentration of plating chemicals for recycling
3. Treatment by distillation of industrial waste water
4. Treatment of spray paint effulent and return of treated water to rinse line
5. Treatment by distillation and concentration of textile dye effulent
6. Concentration of fruit juices for reduced volume
7. Concentration of radiator shop effulents by portable vapor compression distillation unit
8. Production of distilled water for feed stock for power boilers
9. Production of portable distilled drinking water for remote locations
10. Recovery of minerals from sea water by concentration
11. Reduction of volume of toxic or dangerous medical (hospital) waste.
12. Treatment by concentration and distillation of steel mill effulents
13. Distillation of wines into liquors
14. Distillation of water with impurities and hardness for soft drink bottling plants.
15. Treatment of effulents from food processing plants
16. Production of maple syrup through evaporation
17. Treatment of effulents from laundry establishments to remove toxic waste through concentration It is thus seen that the present invention provides an improved process and apparatus for vapor compression distillation. It is also seen that the present invention provides a process and apparatus for vapor compression distillation which is highly efficient and economical. It is also seen that the present invention provides such a vapor compression distillation process and apparatus which can be easily used for a variety of processes, including purifying impure water and resource recovery. It is further seen that the present invention provides a vapor compression distillation process and apparatus which utilizes strategically located components for maximum stratification of temperature and non-condensible gases. It is still further seen that the present invention provides a vapor compression distillation process and apparatus wherein scale attachment to the heat exchanger tubes is controlled better than in conventional systems. It is still further seen that the present invention provides a vapor compression distillation process and apparatus which self-cleans scale build-up on the heat transferring surfaces. Many variations are apparent to those of skill in the art, and such variations are embodied in the spirit and scope of the present invention as measured by the following appended claims.

That which is claimed:

1. A vapor compression distillation apparatus comprising:

a container having a generally vertical longitudinal center axis, said container having a bottom end cap and a top end cap;

a plurality of generally vertical tubes spacedly disposed within said container;

said tubes being fixedly held in position by opposing top and bottom tube sheets defining a condensing chamber therebetween;

said condensing chamber being divided into two smaller chambers, an upper and a lower chamber, said upper and lower chambers being in communication;

an evaporation chamber within said container between said top tube sheet and said top end cap;

a vapor compressor communicating with an upper area of said evaporation chamber and with said upper chamber of said condensing chamber;

heating means communicating with said container; and a plurality of passages for passing a liquid into or out of said container;

whereby a liquid can enter said container below said bottom tube sheet, pass upwardly into, through and above said tubes to a predetermined level where the liquid can be caused by said heating means to boil producing a vapor from some of the liquid, wherein the vapor can rise and pass through said top end cap to a vapor compressor for pressurizing the vapor, and wherein the pressurized vapor can then pass into said upper chamber and said condensing chamber where the pressurized vapor condenses and forms a distillate which can pass through said bottom tube sheet and out of said container.

2. The apparatus according to claim 1 wherein said bottom end cap is generally spherical shaped and wherein at least one of said plurality of passages enters tangentially into said bottom end cap for pumping liquid into said container and simulating a hurricane-like swirl below said bottom tube sheet for sweeping precipitant toward a center of said bottom end cap.

3. The apparatus according to claim 2 wherein said tangentially connecting passage connects at an opposite end with said container above said top tube sheet to pump liquid from above said top tube sheet to said bottom end cap.

4. The apparatus according to claim 3 further comprising a filter within said tangentially connecting passage.

5. The apparatus according to claim 1 wherein said upper chamber of said condensing chamber is partially sectioned off by a baffle positioned within said condensing chamber generally parallel to said top tube sheet whereby said upper chamber is defined by said baffle and said top tube sheet.

6. The apparatus according to claim 1 further including a demister communicating with said top end cap for separating entrained liquids from the vapor prior to passage of the vapor to said vapor compressor.

7. The apparatus according to claim 1 wherein said heating means comprises a conduit passing steam to said container.

8. The apparatus according to claim 1 wherein said heating means communicates with said container above and proximate said top tube sheet.

9. The apparatus according to claim 1 further comprising means for maintaining the liquid at a predetermined level above said top tube sheet.

10. The apparatus according to claim 1 further comprising baffles within said evaporation chamber for inhibiting splashing of boiling liquid from passing with vapor out of said top end cap.

11. The apparatus according to claim 1 further comprising turbulators within said tubes.

12. The apparatus according to claim 11 wherein each of said turbulators comprises a plurality of turbulating members.

13. The apparatus according to claim 12 wherein said turbulating members are connected by a cable.

14. The apparatus according to claim 13 wherein said turbulating members are allowed to move freely while maintained within the tubes.

15. The apparatus according to claim 11 wherein said turbulators are thermoplastic.

16. The apparatus according to claim 1 wherein said tubes are constructed of 300 series stainless steel and wherein each of said tubes is at least two one and one-half (1½) in diameter.

17. The apparatus according to claim 16 wherein said tubes have a wall thickness from approximately 0.020 to 0.049 inches.

* * * * *